United States Patent Office 3,157,684
Patented Nov. 17, 1964

3,157,684
TRITIATED-2-METHYL-NAPHTHAQUINOL-(1,4)-DIPHOSPHORIC ACIDS
Denis Haigh Marrian, Cambridge, and Eustace Anthony Evans, Rickmansworth, England, assignors, by direct and mesne assignments, to United Kingdom Atomic Energy Authority, London, England, a British authority
No Drawing. Filed Feb. 7, 1962, Ser. No. 171,561
Claims priority, application Great Britain Feb. 13, 1961
13 Claims. (Cl. 260—461)

This invention is concerned with novel chemical compounds and with novel processes and novel intermediates useful in preparing the same. More particularly, the invention is concerned with naphthaquinol derivatives and with a process for the manufacture thereof.

It has been known for some time that 2-methyl-naphthaquinol-(1,4) di(phosphoric acid) selectively concentrates at the sites of malignant growths. This was shown by labelling with $^{14}C$, $^{131}I$ and $^{82}Br$ isotopes [see Marrian et al., B.J. of Cancer, 1956, 10, 575 et seq.; ibid., 1956, 10, 739 et seq.]. Despite the γ-emitting properties of the halogen isotopes, the medical use of the acids containing them was not promising as the halogen atoms were rapidly detached from the molecule in vivo. Owing to its emitting properties, the use of $^3H$ was also thought to be of possible value. However, general tritiation (i.e., non-selective labelling with $^3H$) of salts of the acid aforesaid led to compounds in which the tritium was somewhat labile [see J. S. Mitchell et al., British Empire Cancer Campaign, Thirty-Seventh Annual Report, 1959, Part II, 339 et seq.].

It has now been found according to this invention that improved tritiated 2-methyl-naphthaquinol-(1,4) di(phosphoric acid) salts are obtained when the replacement of $^1H$ by $^3H$ therein is confined to the non-substituted ring.

Accordingly, the invention provides as novel and useful naphthaquinol derivatives sodium salts of 2-methyl-naphthaquinol-(1,4) di(phosphoric acid) in which at least one of the four normal hydrogen atoms in the non-substituted ring is replaced by tritium.

These novel derivatives have been found to contain or reduce benign and malignant tumors. Further, their use is accompanied by a alleviation of pain.

The invention also provides a process for the manufacture of said derivatives, which process comprises reductively dehalogenating, using tritium gas in the presence of a hydrogenation catalyst, a 2-methyl-naphthaquinol-(1,4) di(phosphoric acid) tetrasodium salt which is halogen substituted in at least one of positions 5, 6, 7 and 8.

The preferred monohalogeno starting materials are monoiodo and monobromo compounds, e.g., with an iodine or bromine atom in 6-position. The preferred polyhalogeno starting materials are the polybromo compounds, e.g., the 5,6,7-tribromo compound. Suitable hydrogenation (i.e., tritiation) catalysts are platinum oxide and mixtures of platinum oxide and palladium/charcoal or palladium/(calcium carbonate) but any other hydrogenation catalyst which does not affect the phosphate radicals will serve. When reductively dehalogenating trihalogeno (e.g., tribromo) compounds it has been found advantageous to use catalysts which consist of 10% by weight platinum oxide catalyst and 90% by weight of a palladium/(calcium carbonate) catalyst (the latter preferably having a 10% by weight palladium content). The reduction is carried out in aqueous solution. It is preferred to work with aqueous alkaline solutions pH >7 since radiochemical yields are substantially increased by so doing. Any basic agents or buffers which do not contain labile hydrogen can be used to render the solutions alkaline; for example, alkali-metal hydroxides and carbonates, alkaline-earth-metal hydroxides and carbonates, tertiary amines (e.g., trimethyl amine or pyridine) or buffer solutions of pH greater than 7 (e.g., sodium acetate solutions). The preferred basic agent is sodium hydroxide.

It will be appreciated that the reductive dehalogenation can be partially accomplished with tritium and then completed with ordinary hydrogen (thus allowing of a variation in the number of tritium atoms in the product), but this modification of the process is liable to be accompanied by a loss of tritium from the partially dehalogenated intermediate during the removal of the remaining halogen content.

It will be appreciated that the polyhalogenated 2-methyl-naphthaquinol-(1,4) di-(phosphric acid) tetrasodium salts, containing at least two halogen atoms in positions 5, 6, 7 and 8, used as starting materials are new materials and that these new materials also comprise part of the present invention. A method for their preparation is given in Example 5 in detail.

The invention is further disclosed in the following examples, which are illustrative but not limitative thereof.

EXAMPLE 1

50 mg. of the tetrasodium salt of 2-methyl-6-iodonaphthaquinol-(1,4) di(phosphoric acid) were hydrogenated (i.e., tritiated) in 0.2 ml. of water in the presence of 1.5 mg. of platinum oxide and 5 mg. of palladium/charcoal at about 20° C. The tritiation was essentially complete after 4 hours as determined spectrally by a change in the ultraviolet absorption. $\epsilon$ 250/260 at $pH_2=5.0$ for the starting material and 0.55 for the product. Some of the tritium remained in the product but most passed into the water.

The starting material was prepared as follows:

2-Methyl-Naphthalene-(6)-Sulphonyl Chloride 300 g. of finely powdered sodium 2-methyl-naphthalene-(6)-sulphonate (dried at 80° C.) were well mixed with 600 ml. of redistilled phosphorus oxychloride in a 2-liter flask which was then heated on a steam-bath for about 80 minutes with occasional swirling until the contents were mostly liquid. The mixture was poured over ice in a 5-liter beaker and stirred for about 45 minutes until the organic lower layer had solidified. The beaker was then placed in a refrigerator for two hours with frequent stirring and with addition of ice to control the heat developed. The solid was then filtered off, washed well with water, filtered dry under suction and then ground in a mortar with 120 ml. of acetic acid. The almost colourless solid was filtered off, washed with a small amount of methanol and dried in air to give 266 g. of melting point 90–92° C. This was sufficiently pure for reduction to the corresponding sulphinate.

Sodium 2-Methyl-Naphthalene-(6)-Sulphinate 3 liters of water were heated to 70° C. and while stirring well 126 g. of zinc dust followed by 200 g. of 2-methyl-naphthalene-(6)-sulphonyl chloride (melting point=90–92° C.) were added rapidly in portions during 10 minutes. The temperature was raised to 80° C. during 30 minutes and then rapidly to 90° C. 96 ml. of 10-M sodium hydroxide solution were then added which brought the pH of the solution to 7–8. Then 40 g. of sodium carbonate were added to the mixture. The mixture was filtered while hot, the filter-pad washed well with hot water and the combined filtrates allowed to crystallize. 171 g. of colourless solid were obtained. After 3 recrystallizations from water the compound formed colourless prisms.

2-Methyl-6-Iodonaphthalene

To 1 liter of stirred boiling water were added 100 mg. of sodium 2-methyl-naphthalene-(6)-sulphinate and then 130 g. of mercuric chloride together with n-hexanol to reduce frothing. After heating for 2 hours with occasional addition of n-hexanol, the evolution of sulphur dioxide had ceased. The solution was cooled, the mercuric chloride compound filtered off, washed with water then with ethanol and filtered as dry as possible under suction. The solid was treated under reflux with 1.1 liters of ethanol containing 66 g. of iodine. At this point all solids were in solution and a slight excess of iodine was present. The solution was poured into a stirred aqueous solution of potassium iodide and more iodide added until the precipitate was almost colourless. The compound was filtered off, washed well with water and dried at 80° C. for 16 hours giving 46 g. of colourless prisms of M.P. 146–147°.

*Tetrasodium 2-Methyl-6-Iodo-Naphthaquinol-(1,4) Di(Phosphoric Acid)*

2-methyl-6-iodo-naphthaquinone-(1,4) used as intermediate for the preparation of the above compound can be prepared from 2-methyl-6-iodo-naphthalene according to the method described in detail by Andrews, Marrian and Maxwell, J. Chem. Soc. 1956, 1852, as follows:

2.68 g. of 2-methyl-6-iodo-naphthalene were powdered and treated in 15 ml. of acetic acid with 5 g. of chromium trioxide in 3.5 ml. of water and 3.5 ml. of acetic acid dropwise at a temperature below 40° C. The mixture was left at room temperature for one hour and then warmed on a water bath for 30 minutes. On cooling, most of the quinone crystallized, the remainder being obtained by dilution with water. It was washed with water. Recrystallization from methanol gave 1.1 g. (37%) of 2-methyl-6-iodo-naphthaquinone-(1,4) as yellow needles of melting point of 136–137° C.

12 g. of 2-methyl-6-iodo-naphthaquinone-(1,4) were shaken in ether with aqueous sodium dithionite until colourless. The ethereal solution was dried over sodium sulfate and evaporated. The residue was twice dissolved in dry toluene and evaporated in vacuo. To the crude quinol thus obtained were added dry toluene and dimethylaniline, and the mixture was cooled in ice and stirred under nitrogen. After the addition of the necessary amount of freshly distilled phosphorus oxychloride the mixture was stirred at room-temperature overnight. Ice was added, followed by lithium hydroxide solution to bring the pH to 9–10. The precipitated phosphate was filtered off and four volumes of acetone were added to the filtrate. An oil settled out and crystallized on standing in a refrigerator. The solid was triturated with a large amount of ethanol and filtered off. There were obtained 14.1 g. of the lithium salt which was not hydroscopic and appeared spectrally to be 80–90% pure.

7.0 g. of the above lithium salt were dissolved in 25 ml. of water, percolated through a column of a polystyrene nuclear sulphonic acid ion exchange resin (hydrogen ion form) and the column bed washed with water until neutral. The eluate contained 10 mM. of the required material (measured spectrally). 40 ml. of 1 N sodium hydroxide were added and the solution evaporated to dryness in vacuo under nitrogen. The residue was dissolved in 150 ml. of hot methanol, treated with charcoal, filtered and after the addition of 150 ml. of ethanol (giving a slight opalescence) cooled. The mixture was gently heated under reflux and the precipitated solid filtered while hot and dried in vacuo. The yield was 3.5 g. of colourless prisms of tetrasodium 2-methyl-6-iodo-naphthaquinol-(1,4) di(phosphoric acid). A further 1 g. was isolated by further addition of 150 ml. of ethanol to the mother liquors and heating the mixture under reflux.

EXAMPLE 2

52 mg. (0.1 mM.) of tetrasodium 2-methyl-6-iodo-naphthaquinol-(1,4) di(phosphoric acid) were dissolved in 0.5 ml. of 3% aqueous dioxan. 2 ml. of platinum oxide and 2 mg. of 5% palladium/charcoal were added and the mixture was stirred with 2 ml. (5 curies) of tritium gas at about 20° C. for 2–3 hours. 2 mg. of water were added and the catalyst filtered off and thoroughly washed with a total volume of 10 ml. of water. The water and dioxan were distilled off in vacuo and found to contain 3.5 curies of tritium. The dry residue was dissolved in distilled water and made up to 10 ml. 0.1 ml. of this solution was added to a solution of 578 mg. of inactive 2 - methyl - naphthaquinol - (1,4) di(phosphoric acid) in 3–5 ml. of water. The water was removed in vacuo and the activity of the dried product measured (specific activity: 0.17 mc./g.). The sample was recrystallized from aqueous ethanol and the specific activity of the product again determined to be 0.17 mc./g. The activity of the original material was therefore 10 mc. in 0.1 mM., i.e., 0.1 curie/mM., and was radiochemically pure.

EXAMPLE 3

45 mg. of tetrasodium 2-methyl-6-iodo-naphthaquinol-(1,4) di(phosphoric acid) were dissolved in a mixture of 0.2 ml. of water and 0.4 ml. of dioxan. 2 mg. of platinum oxide, 5 mg. of palladium/charcoal and 9 mg. of calcium carbonate were then added. Dehalogenation with 2 ml. (5 curies) of tritium gas while stirring for 16 hours gave a product as in Example 2, having an activity of 300 mc. (specific activity: 5.6 curies/mM.). Dilution analysis as in Example 2 indicated that the material was radiochemically pure.

EXAMPLE 4

55 mg. of tetrasodium 2-methyl-6-iodo-naphthaquinol-(1,4) di(phosphoric acid) were dissolved in a mixture of 0.2 ml. of 0.5 N sodium hydroxide and 0.4 ml. of dioxan. 2 mg. of platinum oxide and 5 mg. of 5% palladium/charcoal were added and the mixture stirred for 16 hours with 2 ml. (5 curies) of tritium gas. The dehalogenation was completed by stirring for a further period of 1 hour with hydrogen. The total uptake of gas was 2.65 ml. at 20° C. Isolation of the product as in Example 2 gave a product having an activity of 2.6 curies (specific activity: 27 curies/mM.). Dilution analysis as in Example 2 indicated a radiochemical purity of 100%.

EXAMPLE 5

90 mg. of tetrasodium 2-methyl-5,6,7-tribromo-naphthaquinol-(1,4) di(phosphoric acid) were dissolved in 0.3 ml. of 3 N sodium hydroxide and a mixture of 2 mg. of platinum oxide and 25 mg. of 10% palladium on calcium carbonate were added. The mixture was stirred for 5 hours with 10 ml. (25 curies) of tritium gas. The total uptake of gas was 7 ml. at 20° C.

Isolation of the product as previously described yielded tetrasodium 2-methyl-5,6,7-tritritio-naphthaquinol-(1,4) di(phosphoric acid) having a total activity of 9 curies (specific activity: 83 curies/mM.). Dilution analysis indicated a radiochemical purity of 100%, which was confirmed by chromatographic analysis on paper using n-butanol/(acetic acid)/water (50:10:40) as solvent. The ultraviolet absorption spectrum was identical with that of the untritiated compound; $\lambda_{max.}$ 2900 A., $\epsilon=5600$ (in 0.1 N hydrochloric acid).

The starting material was prepared as follows:

*2-Methyl-5,7-Dibromo-6-Tosylamino-Naphthalene*

90 g. of 2-methyl-6-amino-naphthalene hydrochloride in 450 ml. of dry pyridine were treated with 90 g. of tosyl chloride in 225 ml. of dry pyridine with stirring. The deep red solution was heated on the steam bath for 1 hour, allowed to cool to about 20° C. and treated dropwise, with stirring, with a solution of 50.4 ml. of bromine in 150 ml. of acetic acid. The maximum temperature during the addition was 50° C. When cool, the mixture was poured into a large volume of water and the sticky solid filtered off and washed with water. It was then triturated with 200 ml. of Cellosolve on the steam bath, recovered by filtration and washed with methanol. 164 g. (75%) of a crude sandy solid were obtained having a melting point of 184–194° C. This was sufficiently pure for detosylation. For analysis, the compound was recrystallized from Cellosolve to a melting point of 203° C.

2-Methyl-5,7-Dibromo-6-Amino-Nahpthalene 5 g. of the crude tosyl derivative obtained above were dissolved in 50 ml. of concentrated sulphuric acid with shaking and the mixture was allowed to stand at about 20° C. for 0.75 hour. The solution was poured on to crushed ice and the solid filtered off, washed with water, suspended twice in 1 N sodium hydroxide, washed free from alkali with water and finally washed with methanol. Recrystallization from Cellosolve gave 2 g. (60%) of the amine as colourless prisms of melting point 131° C. A further 1 g. of melting point 128° C. was isolated from the hot mother liquors by dilution with water. Recrystallization of the first crop from alcohol or petrol did not raise the melting point.

2-Methyl-5,6,7-Tribromo-Naphthalene (a) 148 ml. of concentrated sulphuric acid were cooled to 5° C. and stirred during the addition of 21.2 g. of finely powedered sodium nitrate. The mixture was then heated to 70° C. until solution was complete, cooled to 10° C. and stirred during the gradual addition of a slurry of 88 g. of 2-methyl-5,7-dibromo-6-amino-naphthalene in 1 liter of acetic acid, the temperature being kept below 20° C. The yellow solution was then added to a solution of 35.5 g. of cuprous bromide in 590 ml. of concentrated hydrobromic acid. The initially purple solution turned brown, gas was evolved and a precipitate formed with the return of the purple colour. When gas evolution had ceased, 2 liters of water were added, the solid filtered off, washed with water and then with methanol. After recrystallization from Cellosolve, there were obtained 54 g. (50%) of colourless needles of melting point 105–108° C. A further 12 g. (11%) of melting point 102–104° C. were obtained from the mother liquors. For analysis, the compound was recrystallized twice more to a melting point of 109° C.

(b) 1.4 g. of 2-methyl-5,7-dibromo-6-amino-naphthalene were dissolved in 20 ml. of warm acetic acid, cooled below 20° C. with stirring and treated with a solution of 2 g. of sodium nitrite in 14 ml. of concentrated sulphuric acid prepared according to (a). After standing for 10 minutes, the mixture was treated dropwise with a solution of 2 ml. of bromine in a 50% solution of hydrobromic acid in 20 ml. of acetic acid until no further precipitate formed. The solid diazo-perbromide was filtered off, heated under reflux for 20 minutes with 20 ml. of chloroform and the insolubles heated under reflux with a mixture of 25 ml. of acetic anhydride and 25 ml. of acetic acid until solution was complete. On cooling, 1.2 g. (71%) of light brown needles of melting point 102–103° C. were obtained which, after recrystallization, did not depress the melting point of a sample prepared according to method (a).

2-Methyl-5,6,7-Tribromo-Naphthaquinone-(1,4)

The sodium dichromate solution used was prepared by dissolving the dihydrate in one-half of its weight of water.

55.9 g. of 2-methyl-5,6,7-tribromo-naphthalene were dissolved in 1.25 liters of hot acetic acid and 93 ml. of dichromate solution added. The mixture was cooled to 60–70° C. and 98 ml. of 80% sulphuric acid added slowly with stirring. After standing for 10 minutes, the mixture was quenched with a large volume of water, the precipitate filtered off and washed free from acid. 31.4 g. of the crude solid of melting point 140–150° C. gave 15 g. (40%) of the quinone as orange needles of melting point 185–187° C. The analysis sample had a melting point of 189–190° C. after one further recrystallization.

On heating for 16 hours in a sealed tube at 150° C. with 1.15 ml. of dilute nitric acid, the quinone furnished colourless prisms of melting point 199–201° C.

Tetrasodium 2-Methyl-5,6,7-Tribromo-Naphthaquinol-(1,4) Di(Phosphoric Acid)

5.3 g. of 2-methyl-5,6,7-tribromo-naphthaquinone-(1,4) were dissolved in 250 ml. of warm dry toluene and immediately shaken up with 200 ml. of sodium hydrogen sulphite solution until most of the solid precipitated as a dark grey solid. 200 ml. of ether were added, the mixture shaken and the aqueous layer run off and two more portions, each of 200 ml., of hydrogen sulphite solution added. The mixture was shaken until all of the colour was discharged and the solid went up again into solution. The layer was then washed with 200 ml. of sodium chloride solution, filtered and dried over magnesium sulphate for 10 minutes.

The solution was filtered, evaporated to dryness in vacuo and 130 ml. of dry toluene added thereto. The mixture was stirred, 53 ml. of dry N,N-dimethyl-aniline added and the reaction mixture cooled in an ice-salt mixture. A solution of 64 ml. of phosphorous oxychloride in 64 ml. of dry toluene was added fairly rapidly so as to keep the temperature at 50° C. The stirring and cooling was continued for 16 hours during which time the reaction mixture had warmed up to about 20° C.

The reaction mixture was evaporated to low bulk, 2 x 100 ml. of dry toluene were added and the solution again evaporated to low bulk in vacuo. The residue was thinned with 80 ml. of methylene chloride and poured on to 300 ml. of ice. The mixture was then stirred, cooled in ice-water and 85 ml. of 2 N lithium hydroxide solution were added in portions over 3 hours to keep the pH at 8–9. The aqueous layer was then separated and washed twice with 100 ml. of methylene chloride each time. The aqueous layer was filtered, made pH 8 by the addition of a few ml. of 2 N lithium hydroxide solution and then evaporated to low bulk (about 50 ml.). The solution was filtered, 150 ml. of acetone were added and the mixture allowed to stand in the cold for 16 hours to crystallise. The solid was filtered off, washed twice with 20 ml. of acetone each time, twice with 20 ml. of ether each time and dried. Yield=5.7 g.

This was dissolved in 40 ml. of water and passed through a column of a polystyrene sulphonic acid cation exchange resin (hydrogen ion form) and eluted with water. The acid eluate (200 ml.) was collected, made pH 8 by the addition of about 20 ml. of 2 N sodium hydroxide solution and evaporated to dryness. The residue was dissolved in 100 ml. of methanol, the insoluble solid filtered off and the filtrate evaporated to dryness in vacuo. The residue was dissolved in 35 ml. of water, the solution filtered, 150 ml. of ethanol added and the solution allowed to stand at 0° C. for 16 hours to crystallize. The solid product was filtered off, washed twice with 30 ml. of alcohol each time and then twice with 30 ml. of dry ether each time. The colourless solid was dried in a desiccator for 6 hours and then air-dried for 16 hours. Yield=4.4 g. (46%).

We claim:

1. Sodium salts of 2-methyl-naphthaquinol-(1,4) di(phosphoric acid) in which at least one of the four normal hydrogen atoms in the non-substituted ring is replaced by tritium.

2. Sodium 2-methyl-6-tritio-naphthaquinol-(1,4) di(phosphoric acid).

3. Sodium 2 - methyl - 5,6,7-tritritio-naphthaquinol-(1,4) di(phosphoric acid).

4. 2-methyl-naphthaquinol-(1,4) di(phosphoric acid) tetrasodium salts which contain at least two halogen atoms in positions 5,6,7 and 8.

5. 2 - methyl - 5,6,7 - tribromo-naphthaquinol-(1,4) di(phosphoric acid) tetrasodium salt.

6. Process for the manufacture of sodium salts of 2-methyl-naphthaquinol-(1,4) di(phosphoric acid) in which at least one of the four normal hydrogen atoms in the non-substituted ring is replaced by tritium, which process comprises reductively dehalogenating, using tritium gas in the presence of a hydrogenation catalyst, a 2-methyl-naphthaquinol-(1,4) di(phosphoric acid) tetrasodium salt which is halogen-substituted in at least one of positions 5, 6, 7 and 8.

7. Process according to claim 6, wherein 2-methyl-naphthaquinol-(1,4) di(phosphoric acid) tetrasodium salt with a radical in position 6 selected from the group consisting of iodine and bromine is used as starting material.

8. Process according to claim 6, wherein 2-methyl-naphthaquinol-(1,4) di(phosphoric acid) tetrasodium salt with three bromine atoms in positions 5, 6 and 7 is used as starting material.

9. Process for the manufacture of sodium salts of 2-methyl-naphthaquinol-(1,4) di(phosphoric acid) in which at least one of the four normal hydrogen atoms in the non-substituted ring is replaced by tritium, which process comprises reductively dehalogenating a 2-methyl-naphthaquinol-(1,4) di(phosphoric acid) tetrasodium salt which is halogen-substituted in at least one of positions 5, 6, 7 and 8, using tritium gas in the presence of a hydrogenation catalyst selected from the group consisting of platinum oxide, a mixture of platinum oxide and palladium/charcoal and a mixture of platinum oxide and palladium/(calcium carbonate).

10. Process for the manufacture of sodium 2-methyl-5,6,7 - tritritio-naphthaquinol - (1,4) di(phosphoric acid), which process comprises reductively dehalogenating 2-methyl - 5,6,7 - tribromo - naphthaquinol-(1,4) di(phosphoric acid) tetrasodium salt using tritium gas in the presence of a hydrogenation catalyst consisting of 10% by weight of platinum oxide catalyst and 90% by weight of a palladium/(calcium carbonate) catalyst.

11. Process according to claim 6, wherein the dehalogenation is carried out in aqueous alkaline solution.

12. Process according to claim 11, wherein the aqueous alkaline solution is aqueous sodium hydroxide.

13. Process for the manufacture of sodium salts of 2-methyl-naphthaquinol-(1,4) di(phosphoric acid) in which at least one of the four normal hydrogen atoms in the non-substituted ring is replaced by tritium, which process comprises reductively dehalogenating a 2-methyl-naphthaquinol-(1,4) di(phosphoric acid) tetrasodium salt which is halogen-substituted in at least one of positions 5, 6, 7 and 8, the dehalogenation being effected initially with tritium and subsequently with ordinary hydrogen, in the presence of a hydrogenation catalyst.

References Cited in the file of this patent

FOREIGN PATENTS

| | | |
|---|---|---|
| 73,579 | Denmark | Jan. 2, 1952 |
| 108,775 | Sweden | Oct. 19, 1943 |

OTHER REFERENCES

"Tritium Labeled Compounds," Price List, The Radiochemical Centre, Amersham, Buckinghamshire, England (July 1961), 4 pp.

New England Nuclear Corp., Catalogue and Price List, Schedule H, March 1961, 575 Albany St., Boston 18, Mass., pp. 14, and 16, 260–461.312.